(12) United States Patent
Wang et al.

(10) Patent No.: US 10,663,639 B2
(45) Date of Patent: May 26, 2020

(54) DISPLAY DEVICE

(71) Applicant: BOE TECHNOLOGY GROUP CO., LTD., Beijing (CN)

(72) Inventors: Wei Wang, Beijing (CN); Yafeng Yang, Beijing (CN); Xiaochuan Chen, Beijing (CN); Xianqin Meng, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 128 days.

(21) Appl. No.: 15/752,629

(22) PCT Filed: Aug. 17, 2017

(86) PCT No.: PCT/CN2017/097749
§ 371 (c)(1),
(2) Date: Feb. 14, 2018

(87) PCT Pub. No.: WO2018/076900
PCT Pub. Date: May 3, 2018

(65) Prior Publication Data
US 2019/0033507 A1    Jan. 31, 2019

(30) Foreign Application Priority Data
Oct. 24, 2016   (CN) .......................... 2016 1 0935862

(51) Int. Cl.
*G02F 1/1343* (2006.01)
*F21V 8/00* (2006.01)
(Continued)

(52) U.S. Cl.
CPC ..... *G02B 6/0036* (2013.01); *G02F 1/133615* (2013.01); *G02F 1/134309* (2013.01);
(Continued)

(58) Field of Classification Search
CPC ............ G02B 6/0036; G02F 1/134309; G02F 1/133615; G02F 1/1337; G02F 2001/133742; G02F 2001/133565
(Continued)

(56) References Cited

U.S. PATENT DOCUMENTS 6,215,928 B1 *   4/2001   Friesem ................ G02F 1/025
                                                          372/102
6,356,691 B2     3/2002   Seong-jin et al.
(Continued)

FOREIGN PATENT DOCUMENTS

CN      101329463 A    12/2008
CN      103278958 A     9/2013
WO      2014081415 A1   5/2014

OTHER PUBLICATIONS

Patent Cooperation Treaty, "International Search Report," issued in connection with International Application No. PCT/CN2017/097749, dated Nov. 17, 2017, 4 pages.

*Primary Examiner* — Charles S Chang
(74) *Attorney, Agent, or Firm* — Arent Fox LLP; Michael Fainberg

(57) ABSTRACT

The disclosure provides a display device including an upper substrate (001) and a lower substrate (002) arranged opposite to each other, a liquid crystal layer (003), a wave guiding layer (004), electrode structures (005), and a collimated light source (006). The liquid crystal layer (003) is arranged between the upper substrate (001) and the lower substrate (002); the wave guiding layer (004) is arranged on a side of the lower substrate (002) facing the upper substrate (001), and a refractive index of the wave guiding layer (004) is at least greater than a refractive index of a film layer in contact with the wave guiding layer (004); the plurality of electrode structures (005) are arranged on a side of the upper substrate (001) facing the lower substrate (002), and the plurality of
(Continued)

electrode structures (005) are arrayed in correspondence to sub-pixels in a one-to-one manner; and the collimated light source (006) is at least arranged on one side of the wave guiding layer (004). The display device can control a display grayscale.

18 Claims, 5 Drawing Sheets

(51) Int. Cl.
*G02F 1/13357* (2006.01)
*G02F 1/1337* (2006.01)
*G02F 1/1335* (2006.01)

(52) U.S. Cl.
CPC ............... *G02F 1/1337* (2013.01); *G02F 2001/133565* (2013.01); *G02F 2001/133742* (2013.01)

(58) Field of Classification Search
USPC .......................................................... 349/65
See application file for complete search history.

(56) References Cited

U.S. PATENT DOCUMENTS

| | | | |
|---|---|---|---|
| 2010/0207964 A1* | 8/2010 | Kimmel | G02B 6/0036 345/690 |
| 2011/0134349 A1* | 6/2011 | Wu | G02F 1/13781 349/34 |
| 2012/0092590 A1 | 4/2012 | Shestak et al. | |
| 2016/0091775 A1* | 3/2016 | Gibson | G02B 6/0035 349/186 |
| 2017/0293151 A1* | 10/2017 | Zha | G02B 27/2214 |

\* cited by examiner

DISPLAY DEVICE

CROSS-REFERENCE TO RELATED APPLICATIONS

This application is a National Stage of International Application No. PCT/CN2017/097749, filed Aug. 17, 2017, which claims priority of Chinese Patent Application No. 201610935862.2, filed Oct. 24, 2016, both of which are hereby incorporated by reference in their entireties.

FIELD

Embodiments of this disclosure relate to a display device.

BACKGROUND

At present, existing virtual/augmented reality displays and transparent displays are typically implemented using traditionally structured Liquid Crystal Display (LCD) panels and Organic Light-Emitting Display (OLED) panels.

Moreover as there is a growing display definition as required, there is also a growing demand of display devices with a high Pixels Per Inch (PPI).

SUMMARY

At least one embodiment of this disclosure provides a display device including: an upper substrate and a lower substrate arranged opposite to each other; a liquid crystal layer arranged between the upper substrate and the lower substrate; a wave guiding layer arranged on a side of the lower substrate facing the upper substrate, wherein a refractive index of the wave guiding layer is at least greater than a refractive index of a film layer in contact with the wave guiding layer; a plurality of electrode structures arranged on a side of the upper substrate facing the lower substrate, wherein the plurality of electrode structures are arrayed in correspondence to a plurality of sub-pixels in a one-to-one manner; and a collimated light source at least arranged on one side of the wave guiding layer.

For example, in the display device according to an embodiment of this disclosure, the display device further includes a plurality of grating coupling structures arranged on the surface of the wave guiding layer facing the upper substrate, and in correspondence to the plurality of electrode structures in a one-to-one manner.

For example, in the display device according to an embodiment of this disclosure, each grating coupling structure includes a plurality of grating strips arranged at an interval, and slits arranged between each two adjacent of the grating strips, and a refractive index of each of the plurality of grating coupling structures is $n_o$, $n_e$, or any value between $n_o$ and $n_e$, wherein $n_o$ is the refractive index of liquid crystal molecules in the liquid crystal layer with respect to o-polarized light, and $n_e$ is the refractive index of the liquid crystal molecules in the liquid crystal layer with respect to e-polarized light.

For example, in the display device according to an embodiment of this disclosure, a wavelength $\lambda$ of light, with a controllable light direction, coupled out of the wave guiding layer by the plurality of grating coupling structures, and a grating periodicity $\Lambda$ of the plurality of grating coupling structures satisfy the equation of: $2\pi/\lambda \cdot N_m = 2\pi/\lambda \cdot n_e \sin\theta + q2\pi/\Lambda$ ($q = 0, \pm1, \pm2, \ldots$), wherein $\theta$ is an angle between a direction of the light coupled out of the wave guiding layer and a normal to the surface thereof; $N_m$ is a valid refractive index of the wave guiding layer in the propagation guiding mode; $n_e$ is the refractive index of the liquid crystal layer; and the grating periodicity $\Lambda$ of the plurality of grating coupling structures is a sum of a width of the grating strip and a width of the slit.

For example, in the display device according to an embodiment of this disclosure, a thickness of the plurality of grating coupling structures is no greater than a width of a grating strip in the plurality of grating coupling structures.

For example, in the display device according to an embodiment of this disclosure, the thicknesses of the plurality of grating coupling structures range from 100 nm to 1.5 μm.

For example, in the display device according to an embodiment of this disclosure, each of the plurality of electrode structure comprises electrode strips, each of the electrode strips in the plurality of electrode structures correspond to each of the grating strips in the plurality of grating coupling structures in a one-to-one manner; and a width of each of the electrode strips is no greater than a width of each of the grating strips.

For example, in the display device according to an embodiment of this disclosure, each of the plurality of electrode structures includes first electrode strips and second electrode strips, which are arranged alternately, and insulated from each other, and the first electrode strips and the second electrode strips are configured respectively to have a positive electric signal and a negative electric signal applied thereto.

For example, in the display device according to an embodiment of this disclosure, there is a same spacing between adjacent first and second electrode strips in each of the plurality of electrode structures; and each of the plurality of electrode structures further includes a first connecting electrode strip configured to connect the first electrode strips, and a second connecting electrode strip configured to connect the second electrode strips.

For example, in the display device according to an embodiment of this disclosure, a spacing between adjacent first and second electrode strips is less than a spacing between the electrode structure and the plurality of grating coupling structures in a direction perpendicular to the upper substrate.

For example, in the display device according to an embodiment of this disclosure, the display device further includes a buffer layer arranged between the wave guiding layer and the lower substrate.

For example, in the display device according to an embodiment of this disclosure, the buffer layer is in contact with the wave guiding layer, and the refractive index of the buffer layer is less than the refractive index of the wave guiding layer.

For example, in the display device according to an embodiment of this disclosure, the buffer layer is in contact with the lower substrate, and the refractive index of the buffer layer is greater than the refractive index of the lower substrate.

For example, in the display device according to an embodiment of this disclosure, the collimated light source is light into which monochromatic light emitted from at least three types of monochromatic laser diodes is mixed; or the collimated light source is light into which monochromatic light emitted from at least three types of monochromatic light-emitting diodes is mixed by a collimating structure; or the collimated light source is white light which is emitted by a white light-emitting diode and collimated by a collimating structure; or the collimated light source is collimated light into which light which is emitted by a strip-shaped cold cathode fluorescent lamp and collimated by a collimating structure.

For example, in the display device according to an embodiment of this disclosure, light emitted from the collimated light source is incident onto the wave guiding layer in a manner of being perpendicular to the side of the wave guiding layer, or at an inclination angle satisfying the total reflection condition in the wave guiding layer.

For example, in the display device according to an embodiment of this disclosure, a refractive index of each of the plurality of grating coupling structures is $n_o$; and the display device further includes an alignment layer arranged on the surface of the upper substrate facing the liquid crystal layer, and/or an alignment layer arranged on the surface of the lower substrate facing the liquid crystal layer; and initial orientations of liquid crystal molecules in the liquid crystal layer are perpendicular to the plane where the upper substrate lies.

For example, in the display device according to an embodiment of this disclosure, the refractive index of each of the respective grating coupling structures is $n_e$, or any value between $n_o$ and $n_e$; the display device further includes an alignment layer arranged on the surface of the upper substrate facing the liquid crystal layer, and/or an alignment layer arranged on the surfaces of the plurality of electrode structures facing the liquid crystal layer, and a polarizing sheet arranged on the surface of the upper substrate away from the liquid crystal layer, or a deflecting element arranged at a light exit side of the collimated light source, wherein the deflecting element is configured so that the collimated light source is a collimated polarized light source; and initial orientations of liquid crystal molecules in the liquid crystal layer are perpendicular to the plane where the upper substrate lies.

For example, in the display device according to an embodiment of this disclosure, the display device further includes an alignment layer arranged on the surface of the upper substrate facing the liquid crystal layer, and/or an alignment layer arranged on the surface of the lower substrate facing the liquid crystal layer, and a polarizing sheet arranged on the surface of the upper substrate away from the liquid crystal layer, or a deflecting element arranged at a light exit side of the collimated light source, wherein the deflecting element is configured so that the collimated light source is a collimated polarized light source; and initial orientations of liquid crystal molecules in the liquid crystal layer are perpendicular to the plane where the upper substrate lies.

For example, in the display device according to an embodiment of this disclosure, the refractive index of each of the plurality of grating coupling structures is any value between $n_o$ and $n_e$; and liquid crystal molecules in the liquid crystal layer are of a blue-phase liquid crystal material.

For example, in the display device according to an embodiment of this disclosure, the refractive index of each of the plurality of grating coupling structures is $n_o$ or $n_e$; liquid crystal molecules in the liquid crystal layer are of a blue-phase liquid crystal material; and the display device further includes a polarizing sheet arranged on the surface of the upper substrate away from the liquid crystal layer, or a deflecting element arranged at a light exit side of the collimated light source, wherein the deflecting element is configured so that the collimated light source is a collimated polarized light source.

BRIEF DESCRIPTION OF THE DRAWINGS

In order to make the technical solutions in the embodiments of this disclosure more apparent, the drawings in the embodiments will be introduced below in brief, and apparently the drawings to be described below are merely illustrative of some embodiments of this disclosure, but not intended to limit this disclosure thereto. In the drawings.

DETAILED DESCRIPTION OF THE EMBODIMENTS

Figure 1A:
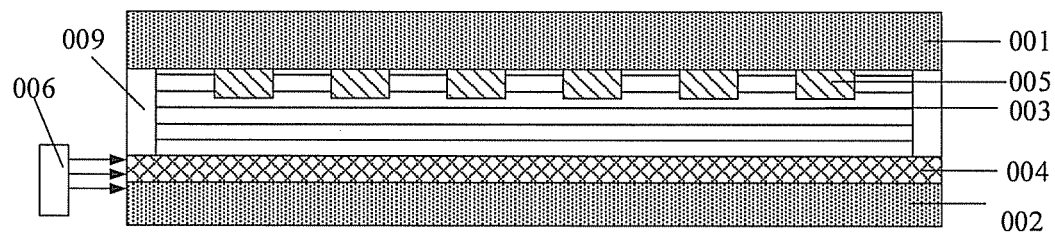
FIG. 1A is a first schematic structural diagram of a display device according to an embodiment of this disclosure.

In order to make the objects, technical solutions, and advantages of the embodiments of this disclosure more apparent, the technical solutions according to the embodiments of this disclosure will be described below clearly and fully with reference to the drawings in the embodiments of this disclosure. Apparently the described embodiments are only a part but all of the embodiments of this disclosure. Based upon the embodiments of this disclosure here, all of other embodiments which can occur to those ordinarily skilled in the art without any inventive effort shall come into the scope of this disclosure as claimed.

Unless defined otherwise, technical terms or scientific terms throughout this disclosure shall convey their usual meaning as appreciated by those ordinarily skilled in the art to which this disclosure pertains. The term "first", "second", or the like throughout this disclosure does not suggest any order, number or significance, but is only intended to distinguish different components from each other. Alike the term "include", "include", or the like refers to that an element or an item preceding to the term encompasses an element(s) or an item(s) succeeding to the term, and its (or their) equivalence(s), but shall not preclude another element (s) or item(s). The term "connect", "connected", or the like does not suggest physical or mechanical connection, but may include electrical connection no matter whether it is direct or indirect. The term "above", "below", "left", "right", etc., is only intended to represent a relative positional relationship, and when the absolute position of an object as described is changed, the relative positional relationship may also be changed accordingly.

The shapes and sizes of respective components in the drawings will not reflect any real proportion of a display device, but are only intended to illustrate the disclosure by way of an example.

At least one embodiment of this disclosure provides a display device including an upper substrate and a lower substrate arranged opposite to each other, a liquid crystal layer, a wave guiding layer, a plurality of electrode structures, and a collimated light source. The liquid crystal layer is arranged between the upper substrate and the lower substrate; the wave guiding layer is arranged on a side of the lower substrate facing the upper substrate, and the refractive index of the wave guiding layer is at least greater than the refractive index of a film layer in contact with the wave guiding layer; the plurality of electrode structures are arranged on a side of the upper substrate facing the lower substrate, and the plurality of electrode structures are arrayed in correspondence to a plurality of sub-pixels in a one-to-one manner, and the collimated light source is at least arranged on one side of the wave guiding layer.

In a different embodiment of this disclosure, for example, the refractive index $n_o$ of liquid crystal molecules in the liquid crystal layer with respect to o-polarized light may be less or greater than the refractive index $n_e$ of the liquid crystal molecules with respect to e-polarized light. The embodiments of this disclosure will be described in details taking $n_o$ less than $n_e$ as an example, although the embodiments of this disclosure will not be limited thereto.

In a different embodiment of this disclosure, for example, collimated backlight exiting from the collimated light source can be incident onto the wave guiding layer perpendicular to a side of the wave guiding layer; and in another example, collimated backlight exiting from the collimated light source can be incident onto the wave guiding layer at an inclination angle satisfying the total reflection condition in the wave guiding layer. For example, the embodiments of this disclosure will be described in details taking the perpendicular incident collimated backlight as an example, although the embodiments of this disclosure will not be limited thereto.

In a different embodiment of this disclosure, for example, collimated backlight exiting from the collimated light source may be incident into only the wave guiding layer; in another example, collimated backlight exiting from the collimated light source may be incident into the wave guiding layer and a buffer layer, and at least a part of the backlight transmitted in the buffer layer may be provided to the wave guiding layer via an interface between the wave guiding layer and the buffer layer; or in still another example, collimated backlight exiting from the collimated light source may be incident into the wave guiding layer, a buffer layer, and the lower substrate, at least a part of the collimated backlight transmitted in the lower substrate may be provided to the buffer layer via an interface between the lower substrate and the buffer layer, and at least a part of the collimated backlight transmitted in the buffer layer may be provided to the wave guiding layer via the interface between the wave guiding layer and the buffer layer.

For example, FIG. 1a illustrates a sectional view of a display device according to an embodiment of this disclosure, where the display device can include: an upper substrate 001 and a lower substrate 002 arranged opposite to each other; a liquid crystal layer 003 arranged between the upper substrate 001 and the lower substrate 002; a wave guiding layer 004 arranged on the side of the lower substrate 002 facing the upper substrate 001, where the refractive index of the wave guiding layer 004 is at least greater than the refractive index of a film layer in contact with the wave guiding layer 004; a plurality of electrode structures 005 arranged on the surface of the upper substrate 001 on the side thereof facing the lower substrate 002, and arrayed in correspondence to a plurality of sub-pixels in a one-to-one manner; and a collimated light source 006 at least arranged on one side of the wave guiding layer 004.

For example, the respective electrode structures 005 can include a plurality of electrode strips arranged at an equal interval (not illustrated), although the embodiments of this disclosure will not be limited thereto. As can be appreciated, the collimated light source 006 is arranged on one side of the wave guiding layer 004. This side is in the thickness direction of the wave guiding layer.

Light may become birefringent while being incident onto a uni-axis crystal (a liquid crystal), thus resulting in two types of polarized light vibrating perpendicularly to each other, i.e., ordinary light and extraordinary light. The vibration direction of the extraordinary light is perpendicular to the vibration direction of the ordinary light, and the angle thereof from the light axis of the uni-axis crystal is not equal to 90°. The refractive index of the liquid crystal with respect to the ordinary light is fixed, and the refractive index thereof with respective to the extraordinary light varies with the varying angle between the vibration direction of the extraordinary light, and the light axis (i.e., the direction of a major axis of a liquid crystal molecule). When the angle is 0°, the refractive index is a specific value represented as $n_e$; when the angle is between 0° and 90°, the refractive index is a varying value represented as $n_e'$; and when the angle is 90°, $n_e' = n_o$. The smaller the angle is, the closer the value of $n_e'$ is to $n_e$; and the larger the angle is, the closer the value of to $n_e'$ is to $n_o$. In this way, the liquid crystal molecules in the corresponding liquid crystal layer 003 can be controlled by the plurality of electrode structures 005 to be deflected so that the angle between the directions of the major axes of the liquid crystal molecules, and the vibration direction of the extraordinary light varies to thereby change the refractive index of the liquid crystals with respect to the extraordinary light.

Hereupon in the display device above according to the embodiment of this disclosure, the liquid crystal molecules in the corresponding liquid crystal layer 003 are controlled by the plurality of electrode structures 005 to be deflected so that they are distributed like optical gratings, and in this way, light in the wave guiding layer 004 can be coupled in a specific mode to thereby select the direction and the color of exiting light, and the refractive index of the liquid crystal layer 003 can be adjusted to thereby control a display grayscale. Furthermore since the plurality of electrode structures 005 are spaced from the wave guiding layer 004 by some distance, interference of the plurality of electrode structures 005 to the wave guiding mode of the wave guiding layer 004 can be lowered in effect to thereby alleviate light from exiting in a dark state so as to improve the contrast of the display device.

Figure 1B:
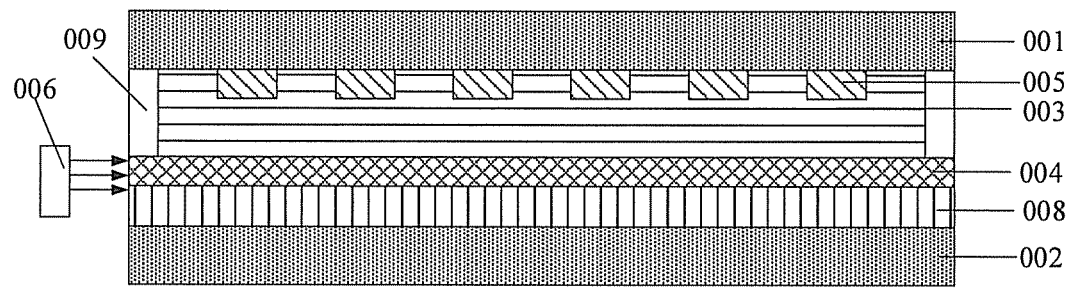
FIG. 1B is a second schematic structural diagram of a display device according to an embodiment of this disclosure.
Figure 1C:
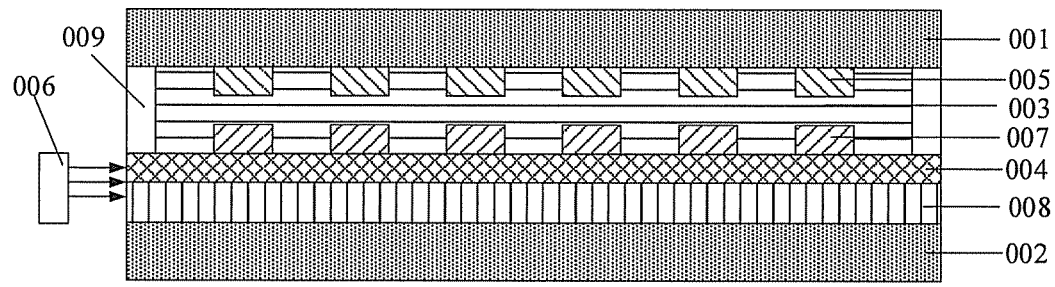
FIG. 1C is a third schematic structural diagram of a display device according to an embodiment of this disclosure.

Alternatively in the display device above according to the embodiment of this disclosure, a light ray out-coupling element can be arranged separately to couple light rays out of the wave guiding layer 004, and as illustrated in FIG. 1C, for example, the display device above according to the embodiment of this disclosure can further include grating coupling structures 007 arranged on the surface of the wave guiding layer 004 on the side thereof facing the upper substrate 001, and in correspondence to the plurality of electrode structures 005 in a one-to-one manner, and the refractive indexes of the respective grating coupling structures 007 is $n_o$, $n_e$ or any value between $n_o$ and $n_e$, where $n_o$ is the refractive index of the liquid crystal molecules with respect to ordinary light (i.e., o-polarized light), and $n_e$ is the refractive index of the liquid crystal molecules with respect to extraordinary light (i.e., e-polarized light).

For example, when the refractive index of the liquid crystal layer 003 is equal to the refractive indexes of the plurality of grating coupling structures 007, the plurality of grating coupling structures 007 are disabled in function so that no light is coupled out of the wave guiding layer 004, which is referred to as the L0 state, i.e., the state at the lowest grayscale (or the black state); when there is the largest difference between the refractive index of the liquid crystal layer 003, and the refractive indexes of the plurality of grating coupling structures 007, the plurality of grating coupling structures 007 function to the best advantage so that light rays are coupled out of the wave guiding layer 004 with the highest efficiency, which is referred to as the L255 state, i.e., the state at the highest grayscale (or the bright state); and when the refractive index of the liquid crystal layer 003 lies between the two instances above, there is an intermediate display grayscale state.

For example, since the light ray out-coupling element shared among the plurality of grating coupling structures 007 or the plurality of electrode structures 005 functions to select the Light exit direction, the display device above according to the embodiment of this disclosure can selectively converge light rays for displaying around human pupils to thereby display an image in a near-eye mode through monocular focusing. Furthermore since the light ray out-coupling element shared among the plurality of grating coupling structures 007 or the plurality of electrode structures 005 can couple in effect light rays out of the wave guiding layer 004 in only several grating periodicities, where the grating periodicity is typically shorter in an order of micrometers or hundreds of nanometers, the size of a pixel may be small, thus facilitating a display with a high Pixels Per Inch (PPI). Furthermore since the light ray out-coupling element shared among the plurality of grating coupling structures 007 or the plurality of electrode structures 005 functions to select the color of exiting light, color filters may be dispensed with, and all the components in the display device can be made of a transparent material to thereby implement a transparent display and a virtual/augmented reality display with high transparency.

Figure 2:
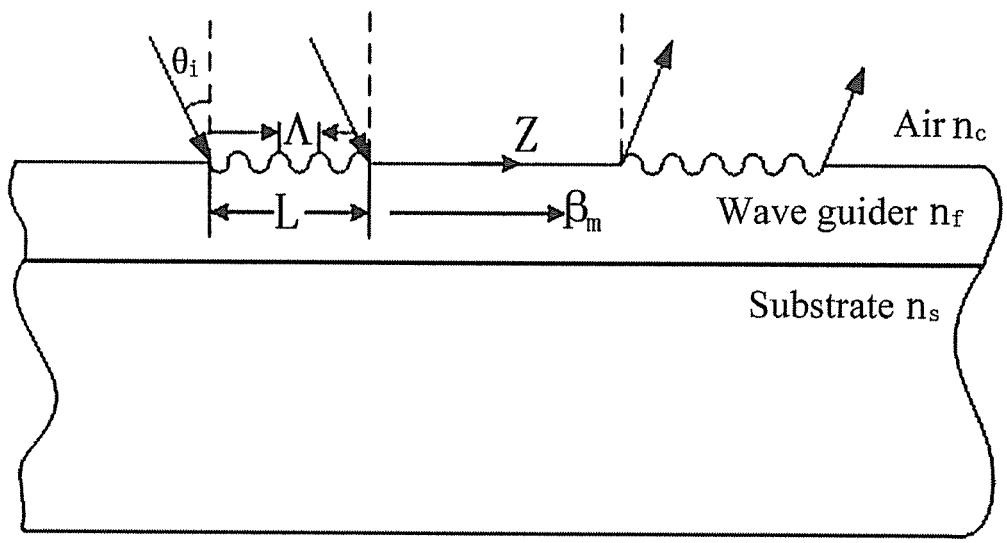
FIG. 2 is a schematic principle diagram of coupling by a light wave guider in the related art.

In optical communication and integrated optics, a light wave guider is a common elementary device. In order to couple in effect a light beam into or out of the wave guider, a grating coupler is commonly applied. As illustrated in FIG. 2, when an incident light beam or an exiting light beam satisfies a phase matching relationship defined in the equation of $\beta_q = \beta_m - qK$ (q=0, ±1, ±2, ...), the incident light can excite the m-th order of guiding mode in the wave guider, or the m-th order of guiding mode can be coupled out of the wave guider in a given direction. In the equation above, $\beta_m$ is a propagation constant $\beta_m = k_0 N_m$ in the m-th order of guiding mode, $N_m$ is a valid refractive index in the m-th order of guiding mode, K is a grating vector, $K=2\pi/\Lambda$, and $\Lambda$ is a grating periodicity.

If the angle between the wave vector direction of the incident light (or the exiting light), and the vertical direction is $\theta_i$, then the phase matching relationship above may be further represented as $k_0 n_e \sin \theta_i = k_0 N_m - q2\pi/\Lambda$ (q=0, ±1, ±2, ...).

Hereupon, in a particular implementation, in the display device above according to the embodiment of this disclosure, the light ray out-coupling element shared among the plurality of grating coupling structures 007 or electrode structures 005 arranged and arrayed on the surface of the wave guiding layer 004 on the side thereof facing the upper substrate 001 functions to select light rays in a given color (at a light wavelength λ) from light rays propagated in the wave guiding layer 004 to exit in a given direction (at an angle θ from the normal to the surface of the wave guiding layer 004). Accordingly a grating coupling structure 007 and an electrode structure 005 correspond to a sub-pixel structure in the display device.

In an optional implementation, the wavelength λ of the light, with a controllable light direction, coupled out of the wave guiding layer 004 by the plurality of grating coupling structures 007 in the display device above according to the embodiment of this disclosure, and the grating periodicity $\Lambda$ of the plurality of grating coupling structures 007 satisfy the equation of $2\pi/\lambda \cdot N_m = 2\pi/\lambda \cdot n_e \sin \theta + q2\pi/\Lambda$ (q=0, ±1, ±2, ...).

Where θ is the angle between the direction of the light coupled out of the wave guiding layer 004, and the normal to the surface thereof; $N_m$ is a valid refractive index of the wave guiding layer 004 in the propagation guiding mode; and $n_e$ is the refractive index of the liquid crystal layer.

Figure 3:
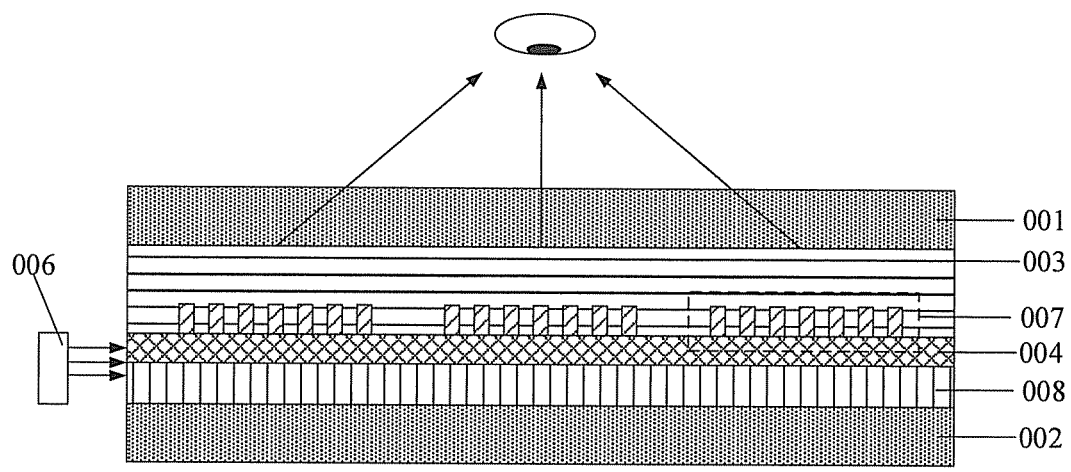
FIG. 3 is a schematic diagram of controlling a light exit direction from a display device according to an embodiment of this disclosure.

In an optional implementation, the direction of light exiting of a pixel at some position in the display device above according to the embodiment of this disclosure tends to be fixed, and determined by the position of the pixel relative to human eyes as illustrated in FIG. 3, that is, the angle θ is fixed. Accordingly the grating periodicity $\Lambda$ of the respective grating coupling structures 007 can be adjusted to thereby select light rays in a given color (at the light wavelength λ) to exit in the given direction (at the angle θ from the normal to the surface of the wave guiding layer 004).

For example, each of the plurality of grating coupling structure 007 in the display device above according to the embodiment of this disclosure includes a plurality of grating strips arranged at an interval, and slits arranged between two adjacent ones of the grating strips. Furthermore the material of the respective grating strips is a transparent medium material, e.g., $SiO_2$, a resin material, etc. Furthermore in order to enable light rays at a preset wavelength to exit the wave guiding layer 004, the refractive indexes of the respective grating strips in each of the plurality of grating coupling structure 007 are $n_o$, $n_e$, or any value between $n_o$ and $n_e$. For example, in the case that $n_o$ is less than $n_e$, the value of n is optionally $n_o$; and in the case that $n_o$ is greater than $n_e$, the value of n is optionally $n_e$. In a grating coupling structure 007, the sum of the width of a grating strip and the width of a slit adjacent thereto is the grating periodicity $\Lambda$ of the plurality of grating coupling structures 007, and as described above, the grate periodicity $\Lambda$ is determined by the desirable direction and color of exiting light. For example, a duty ratio in the plurality of grating coupling structures 007 may be 0.5 (the ratio of the width of a grating strip to the grating periodicity $\Lambda$), but the duty ratio may deviate from this value due to such a difference in brightness between different positions on the display panel that needs to be balanced for the intensity required of exiting light in a real product design, a process condition, and other factors.

It shall be noted that in the embodiment of this disclosure, the refractive index of a grating coupling structure refers to the refractive index of a material of a grating strip in each of the plurality of grating coupling structures. For example, in the case that the material of the grating strip in each of the plurality of grating coupling structures is a resin material, the refractive index of each of the plurality of grating coupling structures is the refractive index of the resin material.

For example, in order to fabricate the plurality of grating coupling structures 007 through etching, in an optional implementation, the thicknesses of the plurality of grating coupling structures 007 (i.e., the thicknesses of the plurality of grating coupling structures 007 in the direction perpendicular to the upper substrate) are generally required to be no greater than the width of a grating strip, although the embodiment of this disclosure will not be limited thereto. As can be appreciated, for example, the thicknesses of all the grating strips in each of the plurality of grating coupling structure 007 are the same, i.e., the thickness of each of the plurality of grating coupling structure 007, and the widths of all the grating strips in each of the plurality of grating coupling structure 007 are the same.

For example, the thicknesses of the respective grating coupling structures 007 in the display device above according to the embodiment of this disclosure may be preset between 100 nm to 1.5 µm. Furthermore the thicknesses of the plurality of grating coupling structures 007 corresponding to sub-pixels in different colors (RGB) may or may not be the same. For example, the thicknesses of the respective grating coupling structures 007 may be approximately 300 nm uniformly, although the embodiment of this disclosure will not be limited thereto. For example, the thicknesses of the respective grating coupling structures 007 may alternatively be 200 nm, 400 nm, 600 nm, or 800 nm.

For example, the number of grating strips in each grating coupling structure 007 can be set as needed in a real application, although the embodiment of this disclosure will not be limited thereto. For example, each grating coupling structure 007 can include two to eight grating strips (e.g., six grating strips).

For example, in the plurality of electrode structures 005 in the display device above according to the embodiment of this disclosure, the respective electrode strips can correspond to the respective grating strips in the plurality of grating coupling structures 007 in a one-to-one manner; and the widths of the electrode strips are no greater than the widths of the grating strips, and for example, the widths of the electrode strips can be equal to the widths of the grating strips.

For example, in order to enable the electrode strips in the plurality of electrode structures 005 to generate an electric field for controlling the liquid crystal to rotate, in the display device above according to the embodiment of this disclosure, the electrode strips in each electrode structure can include first electrode strips and second electrode strips, which are arranged alternately, and insulated from each other, and the first electrode strips and the second electrode strips are configured respectively to have a positive electric signal and a negative electric signal applied thereto. For example, there may be the same spacing between adjacent first and second electrode strips in each electrode structure to thereby improve the uniformity of exiting light.

For example, each electrode structure can further include a first connecting electrode strip configured to connect the first electrode strips, and a second connecting electrode strip configured to connect the second electrode strips. For example, the first connecting electrode strip can connect all the first electrode strips in each electrode structure, and the second connecting electrode strip can connect all the second electrode strips in each electrode structure. In this way, the same positive electric signal can be applied concurrently to all the first electrode strips in each electrode structure, and the same negative electric signal can be applied concurrently to all the second electrode strips in each electrode structure.

For example, the spacing between adjacent first and second electrode strips (the spacing in the direction perpendicular to the extension direction of the electrode strips, and parallel to the upper substrate, i.e., the direction perpendicular to the paper in the drawings) can be less than the spacing between the electrode structure and each of the plurality of grating coupling structures in the direction perpendicular to the upper substrate, so that there are a smaller spacing between positive and negative electrodes, which are arranged alternately in the same plane, a stronger electric field between the electrodes, and a higher capability to control the liquid crystal molecules, and thus a higher response speed and lower driving voltage can be achieved, in the embodiment of this disclosure as compared with an electrode structure in which upper and lower electrodes are arranged.

For example, since the plurality of electrode structures 005 are arranged on the upper substrate, the issue of refractive index matching between the electrode material and the liquid crystal material will not be taken into account, so the problem of light leakage in the black state due to the refractive index mismatch between the electrode material and the liquid crystal material can be alleviated in effect.

For example, in order to fabricate the plurality of electrode structures 005 through etching, in an optional implementation, the thicknesses of the plurality of electrode structures 005 (i.e., the thicknesses of the plurality of electrode structures 005 in the direction perpendicular to the upper substrate) are generally required to be no greater than the width of an electrode strip (i.e., the width of a grating strip in the direction perpendicular to the extension direction thereof, and parallel to the upper substrate, that is the direction parallel to both the paper and the upper substrate in FIG. 1).

In the display device above according to the embodiment of this disclosure, for example, the plurality of electrode structures 005 may be made of a transparent electrically-conductive material, e.g., ITO, etc., and at this time, the thicknesses of the plurality of electrode structures 005 may be controlled between 50 nm to 1000 nm, and may be approximately 100 nm. Alternatively the plurality of electrode structures 005 may be made of a thinner metal material, e.g., Au, an Ag—Mg alloy, etc., and at this time, the thicknesses of the plurality of electrode structures 005 may be controlled between 30 nm and 200 nm. Since the metal material is thinner, there is also a good transmittance of the plurality of electrode structures 005.

For example, the upper substrate 001 and the lower substrate 002 in the display device above according to the embodiment of this disclosure can be selected as needed in a real application, although the embodiments of this disclosure will not be limited thereto. For example, the upper substrate 001 and the lower substrate 002 may be underlying substrates of a common Liquid Crystal Display (LCD) panel or Organic Light-Emitting Diode (OLED) panel, or may be made of some special optical glass, resin material, etc. For example, the thicknesses of the upper substrate 001 and the lower substrate 002 may be preset between 0.1 mm and 2 mm, and their parameters may be determined according to a particular product design or process condition, and for example, there may be good planarity and parallelism of the upper and lower surfaces of the upper substrate 001 and the lower substrate 002.

In an optional implementation, in the display device above according to the embodiment of this disclosure, in order to enable the wave guiding layer 004 to guide as many light rays as possible into the liquid crystal layer 003, for example, the refractive index of the wave guiding layer 004 greater than the refractive index of the film layer in contact with the wave guiding layer 004 may optionally be also greater than the refractive indexes of the other respective layer structures, that is, the refractive index of the wave guiding layer 004 is the highest in the display device. For example, the refractive index of the wave guiding layer 004 needs to be as high as possible in some structural design, and generally the wave guiding layer 004 is required to be transparent, although the embodiments of this disclosure will not be limited thereto. For example, the wave guiding layer 004 may be made of $Si_3N_4$ or the like, although the embodiments of this disclosure will not be limited thereto.

In an optional implementation, in the display device according to the embodiments of this disclosure, for example, the thickness of the wave guiding layer 004 (i.e., the thickness of the wave guiding layer 004 in the direction perpendicular to the upper substrate) may be preset between 100 nm and 100 μm, and when the collimated light source 006 has a good collimating characteristic, or can control in effect the mode in the wave guiding layer 004, the thickness of the wave guiding layer 004 may be increased as appropriate to thereby improve the efficiency of light being incident, for example, the thickness of the wave guiding layer 004 may range from 500 nm to 100 μm (e.g., 700 nm or 10 μm); and when the collimated light source 006 has a poor collimating characteristic, in order to enable the plurality of grating coupling structures 007 to control the direction and the color of exiting light, the thickness of the wave guiding layer 004 needs to be small enough, and the wave guiding layer 004 is optionally a uni-mode wave guider. For example, the thickness of the wave guiding layer 004 is 100 nm or 200 nm, although the embodiments of this disclosure will not be limited thereto.

In order to improve the growth uniformity of film of the wave guiding layer 004, for example, the display device above according to the embodiment of this disclosure can further include a buffer layer 008 arranged between the wave guiding layer 004 and the lower substrate 002 as illustrated in FIG. 1B and FIG. 1C. For example, firstly the buffer layer 008 can be fabricated on the lower substrate 002, and then the wave guiding layer 004 can be grown on the buffer layer 008, thus facilitating a high quality of the thin film of the wave guiding layer 004.

In the display device above according to the embodiment of this disclosure, for example, the thickness of the buffer layer 008 may range from 50 nm to 10 μm. For example, the material of the buffer layer 008 may be a transparent medium material, e.g., $SiO_2$, a resin material, etc.

For example, the buffer layer 008 can be in direct contact with the wave guiding layer 004, and the refractive index of the buffer layer 008 may be less than the refractive index of the wave guiding layer 004. At this time, the collimated backlight exiting from the collimated light source can be incident into both the wave guiding layer and the buffer layer, and at least a part of the collimated backlight transmitted in the buffer layer can be provided to the wave guiding layer via an interface between the wave guiding layer and the buffer layer. In this way, the intensity of the collimated backlight coupled into the wave guiding layer 004 can be improved, and a quality required of light beams of the collimated backlight may be lowered, so that the efficiency of the display device according to the embodiment of this disclosure can be improved.

For example, the buffer layer 008 can be in contact with the lower substrate 002, and the refractive index of the buffer layer 008 can be greater than the refractive index of the lower substrate 002. At this time, the collimated backlight exiting from the collimated light source can be incident into the wave guiding layer, the buffer layer, and the lower substrate, at least a part of the collimated backlight transmitted in the lower substrate can be provided to the buffer layer via an interface between the lower substrate and the buffer layer, and at least a part of the backlight transmitted in the buffer layer can be provided to the wave guiding layer via the interface between the wave guiding layer and the buffer layer. In this way, the intensity of the collimated backlight coupled into the wave guiding layer 004 can be further improved, and a quality required of light beams of the collimated backlight may be lowered, so that the efficiency of the display device according to the embodiment of this disclosure can be further improved.

In the display device above according to the embodiment of this disclosure, for example, the type of the collimated light source can be selected as needed in a real application, although the embodiment of this disclosure will not be limited thereto. For example, in the case that the display device is a monochromatic display device, the collimated backlight exiting from the collimated light source can be monochromatic light. In another example, in the case that the display device is a color display device, the collimated backlight exiting from the collimated light source can be polychromatic light, into which a plurality of types of monochromatic light can be mixed, for example, or which can be available from a light source from which the-polychromatic light exits (e.g., a cold cathode fluorescence tube or a white-light LED).

For example, the collimated light source 006 can be light into which monochromatic light emitted from at least three types of monochromatic laser diodes is mixed, and for example, light emitted from semiconductor laser diodes in three colors of red (R), green (G), and blue (B) is mixed into the collimated light source 006. Alternatively the collimated light source 006 can be light into which monochromatic light emitted from at least three types of monochromatic light-emitting diodes is mixed by a collimating structure, and for example, light emitted from light-emitting diodes in three colors of R, G and B is collimated and mixed into the collimated light source 006. Alternatively the collimated light source 006 can be white light, emitted by a white light-emitting diode, which is collimated by a collimating structure, and for example, white light is emitted by the white light-emitting diode, and collimated by a collimating structure into the collimated light source 006. Alternatively the collimated light source 006 can be collimated backlight into which light rays emitted by a strip-shaped Cold Cathode Fluorescent Lamp (CCFL) are collimated by a collimating structure. The collimated light source 006 will not be limited to the types above.

For example, the collimated light source 006 can be a linear light source, which can extend in the same extension direction as the side of the wave guiding layer 004 (for example, both of them can extend in the direction perpendicular to the paper in the drawings), so that the extent to which the collimated backlight exiting the collimated light source 006 matches with the wave guiding layer 004 can be improved to thereby improve the efficiency of coupling the collimated backlight by the wave guiding layer 004. For example, the size of the collimated backlight in the direction perpendicular to the upper substrate can be selected as needed in a real application, although the embodiment of this disclosure will not be limited thereto.

For example, the width of the collimated backlight in the direction perpendicular to the paper in the drawings can be selected as needed in a real application, although the embodiment of this disclosure will not be limited thereto. For example, in order to enable in effect the collimated light source 006 to be incident onto the side of the wave guiding layer 004, and to be propagated therein, the width of the collimated light source 006 in the display device above according to the embodiment of this disclosure typically matches with the width of the side of the wave guiding layer 004 (e.g., the width of the wave guiding layer 004 in the direction perpendicular to the paper in the drawings), and for example, the backlight collimating structure can be embodied as an array of laser devices, or an array of light-emitting diodes, with the same width as that of the wave guiding layer 004, or the backlight collimating structure can be embodied as a structure including both an array of Laser Devices (LDs), or an array of Light-Emitting Diodes (LEDs), and a diffusing structure arranged on the light exit side of the array of LDs or LEDs.

For example, in order to enable in effect the collimated light from the collimated light source 006 to be propagated in the wave guiding layer 004, the collimated light source 006 in the display device above the embodiment of this disclosure is typically arranged to be incident onto the wave guiding layer 004 perpendicular to the side of the wave guiding layer 004 (for example, the incident collimated backlight can be parallel to the upper substrate and the lower substrate; or in another example, the incident collimated backlight can be parallel to both the upper and lower substrates, and the paper in FIG. 1). For example, the collimated backlight can be incident onto the wave guiding layer 004 exactly perpendicular thereto as much as possible. In another example, when there is a large thickness of the wave guiding layer 004, the collimated light source 006 can alternatively be incident onto the wave guiding layer 004 at an inclination angle satisfying the total reflection condition in the wave guiding layer 004, that is, the collimated light from the collimated light source 006 is incident onto the wave guiding layer 004 at a preset angle to thereby improve the intensity of light rays coupled out of the wave guiding layer 004, and the efficiency of light exiting the display device.

For example, the light rays emitted from the collimated light source 006 generally have a small emanation angle instead of being absolutely collimated, where such a component of the collimated light source 006 that is incident onto a film layer above the wave guiding layer 004, e.g., the liquid crystal layer 003, may be absorbed by a sealing gel 009 on the outmost side of the liquid crystal layer 003 as illustrated in FIG. 1, so the collimated light from the collimated light source 006 will not be incident onto the liquid crystal layer 003 in reality. Furthermore since the total thickness of the buffer layer 008 and the lower substrate 002 is greater than the thickness of the wave guiding layer 004, if the light rays emitted from the collimated light source 006 are coupled into the buffer layer 008 and the lower substrate 002, then the buffer layer 008 and the lower substrate 002 may also function as an auxiliary wave guider. For example, since the refractive index of the wave guiding layer is greater than the refractive index(es) of the film layer(s) adjacent thereto, such a component of the collimated light source 006 that is incident onto the lower substrate 002 and/or the buffer layer 008 will not be well confined by the lower substrate 002 and/or the buffer layer 008, but may be guided into the wave guiding layer 004 to compensate for the waving guiding mode in the wave guiding layer 004, which has been attenuated due to light propagation or grating coupling.

In the display device above according to the embodiment of this disclosure, for example, the liquid crystal layer 003 may be filled into the slits in the plurality of electrode structures 005 and the plurality of grating coupling structures 007, and the thickness of the liquid crystal layer 003 can range from hundreds of nanometers to several micrometers, for example. For example, the thickness of the liquid crystal layer 003 can be set to approximately 1 μm.

In the display panel and the display device above according to the embodiment of this disclosure, for example, the material of the liquid crystal layer 003 can be selected according to a desirable display mode, and an implementation of grayscales.

The display device above according to the embodiment of this disclosure will be described below in details in connection with several examples thereof. It shall be noted that initial orientations of liquid crystal molecules refers to an extension direction of the major axes of the liquid crystal molecules to which no voltage is applied via the plurality of electrode structures in the following examples.

A first example relates to a display mode in which the optical axes of the liquid crystal molecules rotate in the plane perpendicular to the display panel.

Figure 4A:
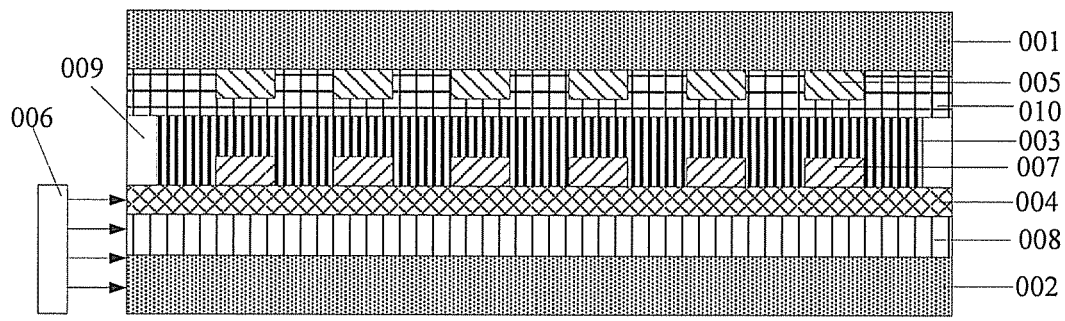
FIG. 4A and FIG. 4B are schematic structural diagrams respectively in a first example.

In this display mode, as illustrated in FIG. 4A, the display device above according to the embodiment of this disclosure further includes an alignment layer 010 (which may be a PI alignment layer with a thickness of 30 nm to 80 nm) arranged on the surface of the upper substrate 001 on the side thereof facing the liquid crystal layer 003, and/or on the surface of the lower substrate 002 on the side thereof facing the liquid crystal layer 003, or may not include any alignment layer 010. FIG. 4A illustrates the alignment layer 010 arranged only on the surface of the upper substrate 001 on the side thereof facing the liquid crystal layer 003. The initial orientations of the liquid crystal molecules in the liquid crystal layer 003 can be controlled through the arranged alignment layer 010, so that the initial orientations of the liquid crystal molecules in the liquid crystal layer 003 are perpendicular to the plane where the upper substrate 001 lies, and at this time, there is the largest difference between the refractive index of the liquid crystal layer 003 (the refractive index of the liquid crystal layer 003 as perceived for e-polarized light in the wave guiding layer 004), and the refractive indexes of the plurality of grating coupling structures, so the plurality of grating coupling structures 007 function to the best advantage so that light rays are coupled out of the wave guiding layer 004 with the highest efficiency, which is referred to the L255 grayscale.

Figure 4B:
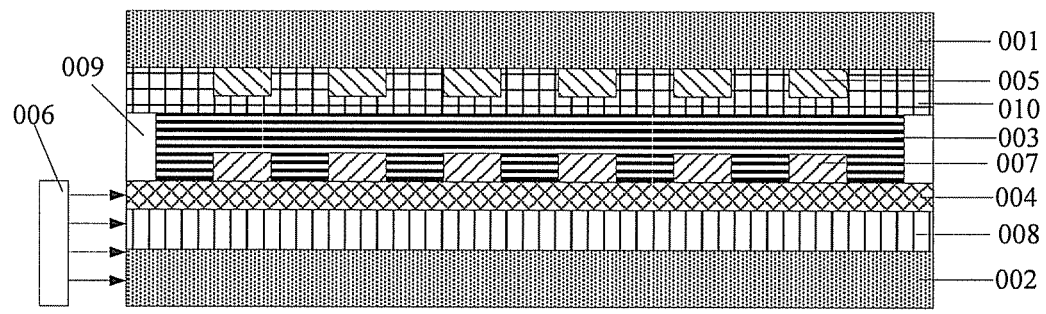

For example, the electric field acting on the liquid crystal layer 003 due to the voltage applied by the respective electrode structures 005 can be adjusted so that the liquid crystal molecules rotate in the plane perpendicular to the display panel (i.e., the plane where the paper in the drawings lies) to thereby adjust the refractive index of the liquid crystal layer 003 between $n_o$ and $n_e$ for different grayscales. As illustrated in FIG. 4B, when the orientations of the liquid crystal molecules are parallel to the upper substrate 001, the refractive index of the liquid crystal layer 003 (the refractive index of the liquid crystal layer 003 as perceived for e-polarized light in the wave guiding layer 004) is equal to the refractive indexes of the plurality of grating coupling structures, so the plurality of grating coupling structures 007 are disabled in function so that no light is coupled out of the wave guiding layer 004, which is referred to as the L0 grayscale.

Since the varying refractive index of the liquid crystal layer 003 is perceivable only for light polarized in the direction parallel to the lower substrate 002, and perpendicular to the lengthy direction of the plurality of grating coupling structures 007 (extraordinary light, i.e., e-light), but not for light polarized in the direction parallel to both the lower substrate 002, and the lengthy direction of the plurality of grating coupling structures 007 (ordinary light, i.e., o-light), the e-polarized light can be displayed in this display mode.

For example, given the refractive indexes $n_o$ of the plurality of grating coupling structures 007, when the refractive index of the liquid crystal layer 003 is equal to the refractive indexes of the plurality of grating coupling structures 007, that is, both of them are $n_o$, the plurality of grating coupling structures 007 are disabled in function so that no light is coupled out of the wave guiding layer 004, and at this time, the grayscale is the lowest, which is referred to as the L0 state; when there is the largest difference between the refractive index of the liquid crystal layer 003 ($n_e$), and the refractive indexes of the plurality of grating coupling structures 007 ($n_o$), the plurality of grating coupling structures 007 function to the best advantage so that light rays are coupled out of the wave guiding layer 004 with the highest efficiency, and at this time, the grayscale is the highest, which is referred to the L255 state; and when the refractive index of the liquid crystal layer 003 lies between the two instances above, there is another grayscale state.

For example, in this implementation, the varying refractive index above is perceivable only when the polarization direction of the light coupled out of the plurality of grating coupling structures 007 is parallel to the lower substrate, and perpendicular to the lengthy direction of the plurality of grating coupling structures 007, but not perceivable for the light polarized in the other directions, so no polarizing sheet will be arranged.

Furthermore for nematic liquid crystals, generally an alignment layer needs to be added to the upper surface of the liquid crystal layer 003, or alignment layers need to be added to both the upper and lower surfaces of the liquid crystal layer 003, to thereby control the initial orientation of the liquid crystal layer 003 so that the liquid crystal molecules can rotate as described above under the control of the voltage being applied, and for example, no alignment layer needs to be arranged for some liquid crystal material.

For example, in this example, since the initial orientations of the liquid crystal molecules in the liquid crystal layer 003 are perpendicular to the upper substrate 001 and the lower substrate 002, the display mode of the display panel in this example is a normally-white display mode. In another example, in the case that the initial orientations of the liquid crystal molecules are parallel to both the upper substrate 001, and the paper in the drawings due to the alignment layer(s), the display mode of the display panel is a normally-black display mode. Accordingly the alignment layer(s) can be arranged as needed in a real application, although the embodiment of this disclosure will not be limited thereto.

For example, the refractive indexes of the plurality of grating coupling structures 007 are equal or approximate to $n_o$ throughout the foregoing description, and at this time, the display device can display normally without requiring any polarizing sheet to be added to the light exit side, or the polarized light to be incident from the side thereof as the collimated light source.

When the refractive indexes of the plurality of grating coupling structures 007 are equal to $n_e$, or between $n_o$ and $n_e$, a polarizing sheet needs to be added to the light exit side of the display device at this time, that is, the-polarizing sheet is arranged on the surface of the upper substrate 001 on the side thereof away from the liquid crystal layer 003; or the collimated backlight incident into the wave guiding layer needs to be polarized light (for example, the collimated light source may need to be a collimated polarized light source, or a deflecting element may be arranged on the light exit side of the collimated light source), so that the collimated backlight can be collimated polarized light to thereby eliminate interference of polarized light exiting independent of orientation deflection of the liquid crystals, and for example, the liquid crystals are generally required to be positive liquid crystals in this display mode.

A second example relates to a display mode in which the optical axes of the liquid crystal molecules rotate in the plane parallel to the display panel.

Figure 5A:
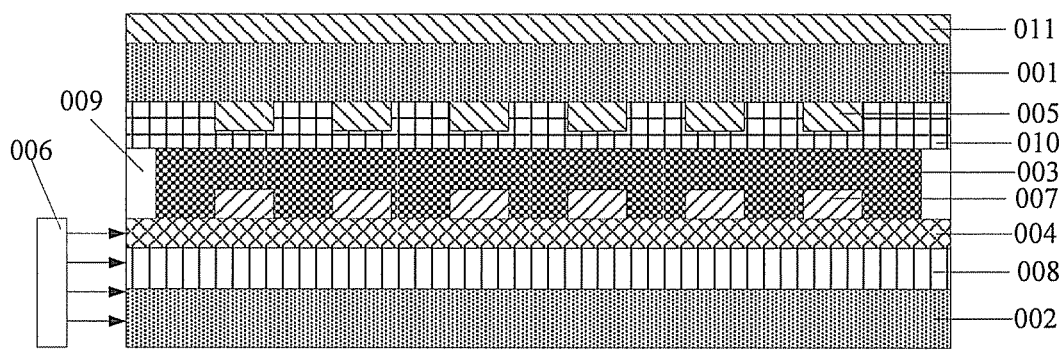
FIG. 5A and FIG. 5B are schematic structural diagrams respectively in a second example.

In this display mode, as illustrated in FIG. 5A, the display device above according to the embodiment of this disclosure further includes an alignment layer 010 (which may be a PI alignment layer with a thickness of 30 nm to 80 nm) arranged on the surface of the upper substrate 001 on the side thereof facing the liquid crystal layer 003, and/or on the surface of the lower substrate 002 on the side thereof facing the liquid crystal layer 003, where FIG. 5A illustrates the alignment layer 010 arranged only on the surface of the upper substrate 001 on the side thereof facing the liquid crystal layer 003; and a polarizing sheet 011 arranged on the surface of the upper substrate 001 on the side thereof away from the liquid crystal layer 003, or the collimated light source which is a collimated polarized light source. The initial orientations of the liquid crystal molecules in the liquid crystal layer 003 can be controlled through the arranged alignment layer 010, so that the initial orientations of the liquid crystal molecules in the liquid crystal layer 003 are parallel to the plane where the upper substrate 001 lies, and for example, the initial orientations of the liquid crystal molecules are parallel to the upper substrate 001, and perpendicular to the paper in the drawings; and polarized light in the direction perpendicular to the paper in the drawings is transmitted through the-polarizing sheet, or the incident light is polarized light in the direction perpendicular to the paper in the drawings, which is referred to the L255 grayscale.

Figure 5B:
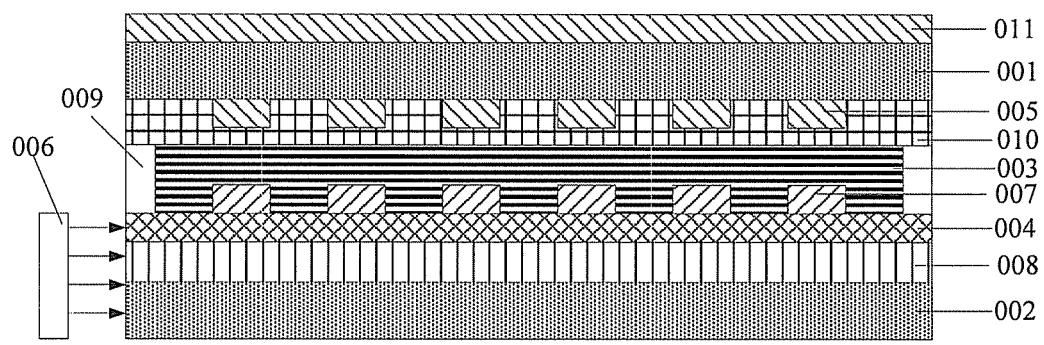

For example, the electric field acting on the liquid crystal layer 003 due to the voltage applied by the respective electrode structures 005 can be adjusted so that the liquid crystal molecules rotate in the plane parallel to the display panel (i.e., perpendicular to the plane where the paper in the drawings lies) to thereby adjust the refractive index of the liquid crystal layer 003 between $n_o$ and $n_e$ for different grayscales. As illustrated in FIG. 5B, for example, when the orientations of the liquid crystal molecules are parallel to both the upper substrate 001, and the paper in the drawings, the refractive index of the liquid crystal layer 003 is equal to the refractive indexes of the plurality of grating coupling structures, so the plurality of grating coupling structures 007 are disabled in function so that no light is coupled out of the wave guiding layer 004, which is referred to as the L0 grayscale.

For example, given the refractive index $n_o$ of the plurality of grating coupling structures 007, as illustrated in FIG. 5B, when the refractive index of the liquid crystal layer 003 is equal to the refractive indexes of the plurality of grating coupling structures 007, that is, both of them are $n_o$, the plurality of grating coupling structures 007 are disabled in function so that no light is coupled out of the wave guiding layer 004, and at this time, the grayscale is the lowest, which is referred to as the L0 state; as illustrated in FIG. 5A, when there is the largest difference between the refractive index ($n_e$) of the liquid crystal layer 003, and the refractive indexes ($n_o$) of the plurality of grating coupling structures 007, the plurality of grating coupling structures 007 function to the best advantage so that light rays are coupled out of the wave guiding layer 004 with the highest efficiency, and at this time, the grayscale is the highest, which is referred to the L255 state; and when the refractive index of the liquid crystal layer 003 lies between the two instances above, there is another grayscale state.

Since the varying refractive index above is perceivable for both light polarized in a first direction, and light polarized in a second direction, where the first direction is a polarization direction parallel to the lower substrate 002, and perpendicular to the lengthy direction of the grating strips, and the second direction is a polarization direction parallel to both the lower substrate 002, and the lengthy direction of the grating strips, a polarizing sheet layer needs to be added to the upper substrate 001, or the side-incident light source to thereby select one of the-polarized light (in the first or second direction).

Furthermore for nematic liquid crystals, generally an alignment layer needs to be added to the upper surface of the liquid crystal layer 003, or alignment layers need to be added to both the upper and lower surfaces of the liquid crystal layer 003, to thereby control the initial orientation of the liquid crystal layer 003 so that the liquid crystal molecules can rotate as described above under the control of the voltage being applied; and furthermore a relative relationship between the initial orientations of the liquid crystal molecules, and the polarization detection direction of the-polarizing sheet can be controlled to thereby determine the normally-white mode (in which the initial orientations of the liquid crystal molecules is identical to the polarization detection direction of the polarizing sheet) or the normally-black mode (in which the initial orientations of the liquid crystal molecules are perpendicular to the polarization detection direction of the polarizing sheet) of the display panel. No alignment layer needs to be arranged for some liquid crystal material. The liquid crystal molecules may be either positive or negative liquid crystals in this mode.

In this example, for example, since the initial orientations of the liquid crystal molecules in the liquid crystal layer 003 are parallel to the upper substrate 001, and perpendicular to the paper, the display mode of the display panel in this example is the normally-white display mode, although the embodiment of this disclosure will not be limited thereto. In another example, in the case that the initial orientations of the liquid crystal molecules are parallel to both the upper substrate 001, and the paper in the drawings due to the alignment layer(s), the display mode of the display panel is the normally-black display mode. Accordingly the alignment layer(s) can be arranged as needed in a real application, although the embodiment of this disclosure will not be limited thereto.

A third example relates to a display mode in which blue-phase liquid crystals are applied.

Figure 6A:
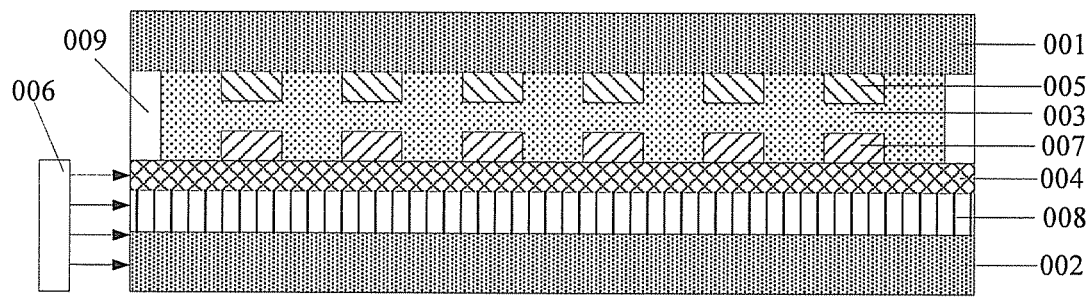
FIG. 6A and FIG. 6B are schematic structural diagrams respectively in a third example.
Figure 6B:
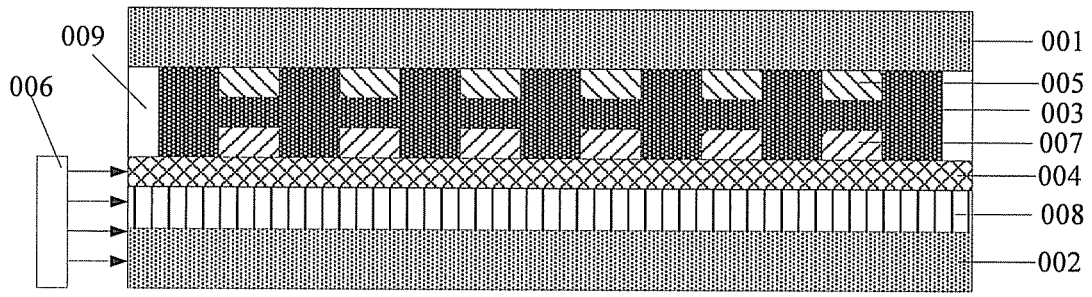

In this display mode, as illustrated in FIG. 6A, the liquid crystal molecules in the liquid crystal layer 003 in the display device above according to the embodiment of this disclosure are made of a blue-phase liquid crystal material for which no alignment film is arranged. When no voltage is applied to the respective electrode structures 005, the liquid crystal molecules are in the isotropic state as illustrated in FIG. 6A; and when voltage is applied, they are in the anisotropic state as illustrated in FIG. 6B, and this anisotropic state is perceivable for both of the two types of polarized light, so there is higher efficiency of light exiting than the several embodiments above. For example, since the blue-phase liquid crystals are isotropic when no voltage is applied thereto, there is the same refractive index in the respective directions, so that both of the refractive indexes of the two types of polarized light passing through the liquid crystals are n; and since the blue-phase liquid crystals are anisotropic when voltage is applied thereto, the refractive index of the ordinary light (o-light) is $n_o$, and the refractive index of the extraordinary light (e-light) is $n_e$, where $n_o < n < n_e$.

In view of this, the isotropic state can be set to the L0 state (the refractive indexes of the plurality of grating coupling structures 007 are n), and there is no light to be coupled and exit; and the anisotropic state can be set to the L255 state. At this time, both of the two types of polarized light can be coupled out of the wave guiding layer, so there is higher efficiency of light exiting. Alternatively the isotropic state can be set to the L0 state (the refractive indexes of the plurality of grating coupling structures 007 are $n_o$ or $n_e$), and the anisotropic state can be set to the L255 state; and at this time, the incident light needs to be polarized light, that is, the collimated light source is a collimated polarized light source, or a polarizing sheet may be arranged at the light exit side, that is, the-polarizing sheet is arranged on the surface of the upper substrate 001 on the side thereof away from the liquid crystal layer 003.

For example, the display device above according to the embodiment of this disclosure can be a virtual reality/augmented reality display device, a near-eye display device, a mobile phone, a tablet computer, a TV set, a monitor, a notebook computer, a digital photo frame, a navigator, or any product or component with a display function.

In the display device above according to the embodiments of the invention, the liquid crystal molecules in the corresponding liquid crystal layer are controlled by the plurality of electrode structures to be deflected so that they are distributed like gratings, and in this way, light in the wave guiding layer can be coupled in a specific mode to thereby select the direction and the color of exiting light; and the refractive index of the liquid crystal layer can be adjusted to thereby control a display grayscale. Since the plurality of electrode structures are spaced from the wave guiding layer by some distance, interference of the plurality of electrode structures to the wave guiding mode of the wave guiding layer can be lowered in effect to thereby alleviate light from exiting in a dark state so as to improve the contrast of the display device. Since the light ray out-coupling element shared among the plurality of grating coupling structures functions to select the light exit direction, the display device above according to the embodiment of this disclosure can selectively converge light rays for displaying around human pupils to thereby display an image in a near-ear mode through monocular focusing. Furthermore since the light ray out-coupling element shared among the plurality of grating coupling structures can couple in effect light rays out of the wave guiding layer in only several grating periodicities, where the grating periodicity is typically short in an order of micrometers or hundreds of nanometers, the size of a pixel may be small, thus facilitating a display with a high Pixels Per Inch (PPI). Furthermore since the light ray out-coupling element shared among the plurality of grating coupling structures functions to select the color of exiting light, color filters may be dispensed with, and all the components in the display device can be made of a transparent material to thereby implement a transparent display and a virtual/augmented reality display with high transparency.

The foregoing description is merely illustrative of the exemplary embodiments of this disclosure, but not intended to limit the scope of this disclosure as claimed thereto. The scope of this disclosure as claimed shall be as defined in the appended claims.

The invention claimed is:

1. A display device, comprising:
   an upper substrate and a lower substrate arranged opposite to each other;
   a liquid crystal layer arranged between the upper substrate and the lower substrate;
   a wave guiding layer arranged on a side of the lower substrate facing the upper substrate, wherein a refractive index of the wave guiding layer is at least greater than a refractive index of a film layer in contact with the wave guiding layer;
   a plurality of electrode structures arranged on the side of the upper substrate facing the lower substrate, wherein the plurality of electrode structures are arrayed in correspondence to a plurality of sub-pixels in a one-to-one manner; and
   a collimated light source at least arranged on one side of the wave guiding layer;
   the display device further comprises a plurality of grating coupling structures arranged on a surface of the wave guiding layer facing the upper substrate, and in correspondence to the plurality of electrode structures in a one-to-one manner;
   wherein each of the plurality of grating coupling structures comprises a plurality of grating strips arranged at an interval, and slits arranged between each two adjacent of the grating strips, and a refractive index of each of the plurality of grating coupling structures is $n_o$, $n_e$, or any value between $n_o$ and $n_e$, wherein $n_o$ is a refractive index of liquid crystal molecules in the liquid crystal layer with respect to o-polarized light, and $n_e$ is a refractive index of the liquid crystal molecules in the liquid crystal layer with respect to e-polarized light.

2. The display device according to claim 1, wherein a wavelength λ of light, with a controllable light direction, coupled out of the wave guiding layer by the plurality of grating coupling structures, and a grating periodicity Λ of the plurality of grating coupling structures satisfies the equation of:

$$2\pi/\lambda \cdot N_m = 2\pi/\lambda \cdot n_e \sin\theta + q 2\pi/\Lambda (q=0, \pm 1, \pm 2, \ldots),$$

wherein θ is an angle between a direction of the light coupled out of the wave guiding layer, and a normal to a surface thereof; $N_m$ is a valid refractive index of the wave guiding layer in a propagation guiding mode; $n_e$ is a refractive index of the liquid crystal layer; and the grating periodicity Λ of the plurality of grating coupling structures is a sum of a width of the grating strip and a width of the slit.

3. The display device according to claim 1, wherein a thickness of the plurality of grating coupling structures are no greater than a width of a grating strip in the plurality of grating coupling structures.

4. The display device according to claim 3, wherein the thickness of the plurality of grating coupling structures ranges from 100 nm to 1.5 μm.

5. The display device according to claim 1, wherein each of the plurality of electrode structures comprises electrode stripes, each of the electrode strips in the plurality of electrode structures correspond to each of the grating strips in the plurality of grating coupling structures in a one-to-one manner; and a width of each of the electrode strips is no greater than a width of each of the grating strips.

6. The display device according to claim 1, wherein each of the plurality of electrode structures comprises first electrode strips and second electrode strips, the first electrode strips and the second electrode strips are arranged alternately and insulated from each other, and the first electrode strips and the second electrode strips are configured respectively to have a positive electric signal and a negative electric signal applied thereto.

7. The display device according to claim 6, wherein there is a same spacing between adjacent ones of the first and second electrode strips in each of the plurality of electrode structures; and
   each of the plurality of electrode structures further comprises a first connecting electrode strip configured to connect the first electrode strips, and a second connecting electrode strip configured to connect the second electrode strips.

8. The display device according to claim 6, wherein a spacing between adjacent first and second electrode strips is less than a spacing between the electrode structure and each of the plurality of grating coupling structures in a direction perpendicular to the upper substrate.

9. The display device according to claim 1, further comprises a buffer layer arranged between the wave guiding layer and the lower substrate.

10. The display device according to claim 9, wherein the buffer layer is in contact with the wave guiding layer, and a refractive index of the buffer layer is less than the refractive index of the wave guiding layer.

11. The display device according to claim 9, wherein the buffer layer is in contact with the lower substrate, and a refractive index of the buffer layer is greater than the refractive index of the lower substrate.

12. The display device according to claim 1, wherein the collimated light source is light into which monochromatic light emitted from at least three types of monochromatic laser diodes is mixed; or the collimated light source is light into which monochromatic light emitted from at least three types of monochromatic light-emitting diodes is mixed by a collimating structure; or the collimated light source is white light which is emitted by a white light-emitting diode and collimated by a collimating structure; or the collimated light source is collimated light which is emitted by a strip-shaped cold cathode fluorescent lamp and collimated by a collimating structure.

13. The display device according to claim 1, wherein light emitted from the collimated light source is incident onto the wave guiding layer in a manner of being perpendicular to a side of the wave guiding layer, or at an inclination angle satisfying a total reflection condition in the wave guiding layer.

14. The display device according to claim 1, wherein a refractive indexes of each of the plurality of grating coupling structures are $n_o$;
   the display device further comprises an alignment layer arranged on a surface of the upper substrate facing the liquid crystal layer, and/or on a surface of the lower substrate facing the liquid crystal layer; and
   initial orientations of liquid crystal molecules in the liquid crystal layer are perpendicular to a plane where the upper substrate lies.

15. The display device according to claim 1, wherein a refractive indexes of each of the plurality of grating coupling structures are $n_e$, or any value between $n_o$ and $n_e$;
   the display device further comprises an alignment layer arranged on a surface of a upper substrate facing the liquid crystal layer, and/or on a surface of the plurality of electrode structures facing the liquid crystal layer, and
   a polarizing sheet arranged on a surface of the upper substrate away from the liquid crystal layer, or a deflecting element arranged at a light exit side of the collimated light source, wherein the deflecting element is configured so that the collimated light source is a collimated polarized light source; and initial orientations of liquid crystal molecules in the liquid crystal layer are perpendicular to a plane where the upper substrate lies.

16. The display device according to claim 1, further comprises an alignment layer arranged on a surface of the upper substrate facing the liquid crystal layer, and/or an alignment layer arranged on a surface of the lower substrate facing the liquid crystal layer, and a polarizing sheet arranged on a surface of the upper substrate away from the liquid crystal layer, or a deflecting element arranged at a light exit side of the collimated light source, wherein the deflecting element is configured so that the collimated light source is a collimated polarized light source; and initial orientations of liquid crystal molecules in the liquid crystal layer are perpendicular to a plane where the upper substrate lies.

17. The display device according to claim 1, wherein a refractive index of each of the plurality of grating coupling structures are any value between $n_o$ and $n_e$; and liquid crystal molecules in the liquid crystal layer are of a blue-phase liquid crystal material.

18. The display device according to claim 1, wherein a refractive index of each of the plurality of grating coupling structures are $n_o$ or $n_e$;

liquid crystal molecules in the liquid crystal layer are of a blue-phase liquid crystal material; and the display device further comprises a polarizing sheet arranged on a surface of the upper substrate away from the liquid crystal layer, or a deflecting element arranged at a light exit side of the collimated light source, wherein the deflecting element is configured so that the collimated light source is a collimated polarized light source.

* * * * *